United States Patent
Tsujiguchi et al.

(10) Patent No.: US 11,791,520 B2
(45) Date of Patent: Oct. 17, 2023

(54) WELDING STRUCTURE OF METAL MEMBERS, METHOD OF WELDING METAL MEMBERS, AND POWER STORAGE MODULE

(71) Applicant: Prime Planet Energy & Solutions, Inc., Tokyo (JP)

(72) Inventors: Takafumi Tsujiguchi, Himeji (JP); Kazuki Oshima, Himeji (JP); Ryoichi Wakimoto, Kobe (JP); Hiroshi Takabayashi, Koriyama (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 118 days.

(21) Appl. No.: 17/398,001

(22) Filed: Aug. 10, 2021

(65) Prior Publication Data

US 2022/0059907 A1    Feb. 24, 2022

(30) Foreign Application Priority Data

Aug. 20, 2020  (JP) ................................. 2020-139363

(51) Int. Cl.
*H01M 50/516*    (2021.01)
*H01M 50/51*    (2021.01)
(Continued)

(52) U.S. Cl.
CPC .......... *H01M 50/516* (2021.01); *H01G 9/008* (2013.01); *H01M 50/51* (2021.01); *H01R 4/029* (2013.01)

(58) Field of Classification Search
CPC .... H01M 50/516; H01M 50/51; H01G 9/008; H01G 2/06; H01G 11/82; H01G 11/74; H01R 4/029
See application file for complete search history.

(56) References Cited

U.S. PATENT DOCUMENTS

2013/0188296 A1* 7/2013 Widhalm ............... H01B 1/026
205/271
2015/0179539 A1    6/2015 Tamai
(Continued)

FOREIGN PATENT DOCUMENTS

CN    104733421 A    6/2015
CN    107073650 A    8/2017
(Continued)

OTHER PUBLICATIONS

Lin et al., "Encyclopedia of Chinese Medicine Clinical Medicine Oral Medicine 3", China Union Medical University Press, May 2019, pp. 230-231, 6pp.
(Continued)

*Primary Examiner* — Stewart A Fraser
(74) *Attorney, Agent, or Firm* — HAUPTMAN HAM, LLP (57) ABSTRACT

A welding structure of metal members includes a first member having a first opposing surface, a second member having a second opposing surface, and a welding portion fixing the first member and the second member to each other. A gap is formed between the first opposing surface and the second opposing surface. R1>R2 is satisfied where R1 represents a width of the welding portion in the gap and R2 represents a width of the welding portion on the first opposing surface of the first member. T2>T1 is satisfied where T2 represents a thickness of the second member in the portion where the welding portion is formed and T1 represents a thickness of the first member in the portion where the welding portion is formed. $0.8 \leq D1/T1 \leq 1.2$ is satisfied where D1 represents a depth of the welding portion in the second member from the second opposing surface.

9 Claims, 8 Drawing Sheets

(51) Int. Cl.
*H01G 9/008* (2006.01)
*H01R 4/02* (2006.01)

(56) References Cited

U.S. PATENT DOCUMENTS

| | | |
|---|---|---|
| 2017/0314595 A1 | 11/2017 | Tokunaga et al. |
| 2018/0221989 A1 | 8/2018 | Matsuoka et al. |
| 2020/0009685 A1* | 1/2020 | Kumazawa ......... H01M 50/522 |
| 2021/0162539 A1 | 6/2021 | Kayahara et al. |

FOREIGN PATENT DOCUMENTS

| | | |
|---|---|---|
| CN | 107921584 A | 4/2018 |
| JP | S59133985 A | 8/1984 |
| JP | 2004148334 A | 5/2004 |
| JP | 2017168349 A | 9/2017 |
| JP | 202028902 A | 2/2020 |
| WO | 2017022238 A1 | 2/2017 |
| WO | 2020050379 A1 | 3/2020 |

OTHER PUBLICATIONS

Office Action in CN Application No. 202110952362.0 dated May 5, 2023, 20pp.

Song et al., "Manual of Artificial Diamond Tools", Metallurgical Industry Press, Jan. 2014, pp. 783-785, 6pp.

* cited by examiner

WELDING STRUCTURE OF METAL MEMBERS, METHOD OF WELDING METAL MEMBERS, AND POWER STORAGE MODULE

This nonprovisional application is based on Japanese Patent Application No. 2020-139363 filed on Aug. 20, 2020, with the Japan Patent Office, the entire contents of which are hereby incorporated by reference.

BACKGROUND OF THE INVENTION

Field of the Invention

The present disclosure relates to a welding structure of metal members, a method of welding metal members, and a power storage module.

Description of the Background Art

PTL 1 (Japanese Patent Laid-Open No. 2004-148334) discloses, in a lapping weld joint in which steel plates are lapped and laser welded, welding is performed by providing a gap of a predetermined width between the upper and lower steel plates.

PTL 2 (Japanese Patent Laid-Open No. 59-133985) discloses, in a welding method for welding members to be welded by irradiating a welding portion with a laser beam, a gap having a width smaller than the plate thickness of the member to be welded is provided.

PTL 3 (Japanese Patent Laid-Open No. 2017-168349) discloses, in a structure in which a bus bar is welded to an electrode terminal of a power storage device, a concave portion is provided on one surface of the bus bar (a surface opposed to a surface of the electrode terminal) and a convex portion is provided on the other surface of the bus bar.

In the welding structure of the metal members, from the viewpoint of increasing the welding strength, it is desirable to increase the size (area) of the welding portion. On the other hand, it is desirable to reduce thermal influence on the base material and peripheral members due to welding. It is required to satisfy the above-described two requirements while achieving downsizing of the whole members including the welding structure.

The structures described in PTL 1 to PTL 3 are not necessarily sufficient to satisfy the above-described requirements.

SUMMARY OF THE INVENTION

An object of the present disclosure is to provide a welding structure of metal members, a method of welding metal members, and a power storage module, which can reduce the thermal influence on a base material and peripheral members while ensuring welding strength.

A welding structure of metal members according to the present disclosure includes a first member having a first opposing surface, a second member having a second opposing surface opposed to the first opposing surface, and a welding portion fixing the first member and the second member to each other. A gap is formed between the first opposing surface and the second opposing surface.

A power storage module according to the present disclosure includes a plurality of power storage cells each having an electrode terminal and being arranged along a predetermined direction, a bus bar connecting the electrode terminals of the plurality of power storage cells to each other, and the above-described welding structure of metal members including the bus bar as the first member and the electrode terminal as the second member.

A method of welding metal members according to the present disclosure includes overlapping a first member having a first opposing surface and a second member having a second opposing surface in a state where the first opposing surface and the second opposing surface oppose each other and a gap is formed between the first opposing surface and the second opposing surface, and laser welding the first member and the second member by irradiating with a laser beam a surface of the first member opposite to the first opposing surface. A welding portion is formed by the laser welding so as to penetrate the first member and extend from the second opposing surface facing the gap toward the inside of the second member.

In the welding structure and the method of welding metal members, R1>R2 is satisfied where R1 represents a width of the welding portion in the gap formed between the first opposing surface and the second opposing surface and R2 represents a width of the welding portion on the first opposing surface of the first member. T2>T1 is satisfied where T2 represents a thickness of the second member in the portion where the welding portion is formed and T1 represents a thickness of the first member in the portion where the welding portion is formed. $0.8 \leq D1/T1 \leq 1.2$ is satisfied where D1 represents a depth of the welding portion in the second member from the second opposing surface.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described. In the embodiments described below, when reference is made to the number, the amount, and the like, the scope of the present disclosure is not necessarily limited to the number, the amount, and the like unless otherwise specified. In the following embodiments, each component is not necessarily essential to the present disclosure unless otherwise specified.

Figure 1:
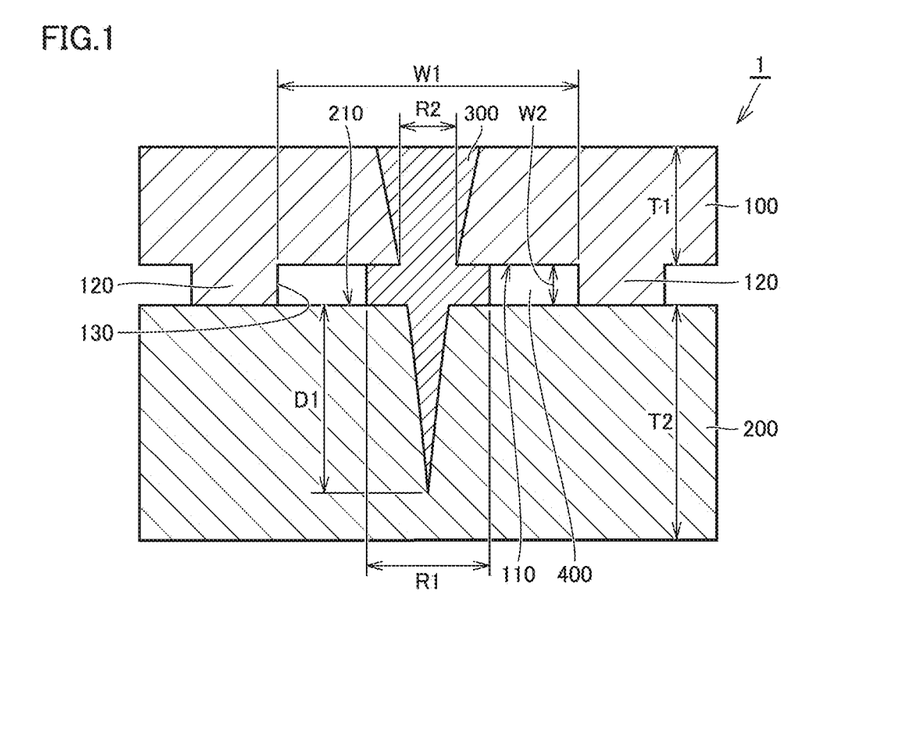
FIG. 1 is a cross-sectional view showing a welding structure of metal members according to an embodiment.
Figure 2:
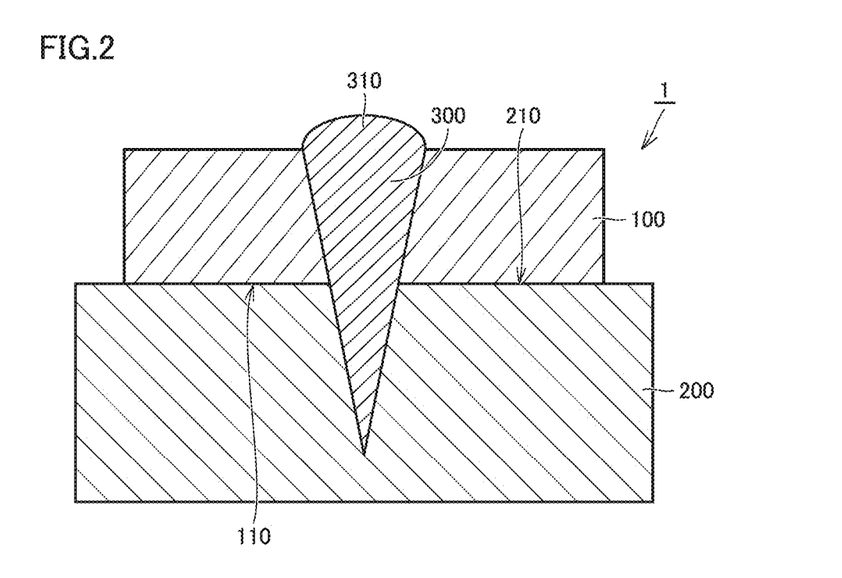
FIG. 2 is a cross-sectional view showing a welding structure of metal members according to a comparative example.
Figure 3:
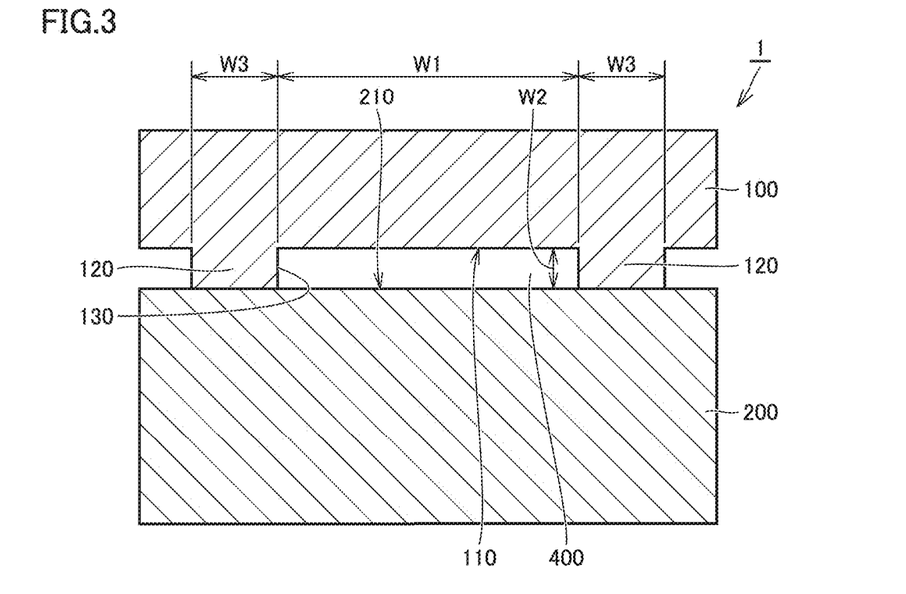
FIG. 3 is a cross-sectional view showing metal members to which the welding structure of the metal members according to an embodiment is applied.

FIG. 1 is a cross-sectional view showing a welding structure of metal members according to the present embodiment. FIG. 2 is a cross-sectional view showing a welding structure of metal members according to a comparative example. FIG. 3 is a cross-sectional view showing metal members to which the welding structure shown in FIG. 1 is applied.

As shown in FIG. 1, a welding structure 1 of metal members is a structure in which a first member 100 and a second member 200 are joined by a welding portion 300.

First member 100 includes a first opposing surface 110 opposed to second member 200, a protrusion 120 protruding from first opposing surface 110 toward second member 200, and a concave portion 130 formed between two protrusions 120. Second member 200 includes a second opposing surface 210 opposed to first opposing surface 110.

First member 100 and second member 200 are metal members. First member 100 and second member 200 are preferably made of the same material, but first member 100 and second member 200 may be made of different materials.

Examples of the metal constituting first member 100 and second member 200 include aluminum, copper, and steel.

Welding portion 300 is formed, for example, by laser welding in which first member 100 side is irradiated with a laser beam. Welding portion 300 fixes first member 100 and second member 200 to each other. A gap 400 is formed between first opposing surface 110 and second opposing surface 210 by the tip of protrusion 120 contacting second opposing surface 210. Welding portion 300 is formed so as to penetrate first member 100 and extend toward the inside of second member 200 from second opposing surface 210 facing gap 400. Welding portion 300 is formed in a linear shape extending in a direction perpendicular to the plane of FIG. 1.

Protrusion 120 of first member 100 and gap 400 are adjacent to each other. Accordingly, in FIG. 1, the thickness of first member 100 is different between the position opposed to gap 400 and the position adjacent to gap 400. Specifically, the thickness of first member 100 at a position adjacent to gap 400 is larger than the thickness of first member 100 at a position opposed to gap 400.

When the protrusion or the concave portion is formed in second member 200, the thickness of second member 200 at a position adjacent to gap 400 is larger than the thickness of second member 200 at a position opposed to gap 400.

As shown in FIG. 1, R1>R2 is satisfied where R1 represents the width of welding portion 300 in gap 400 and R2 represents the width of welding portion 300 on first opposing surface 110 of first member 100. Preferably, $1.0<R1/R2<2.5$, more preferably $1.2<R1/R2<2.5$, and still more preferably $1.5<R1/R2<1.7$. Qualitatively, when the value of R1/R2 is large, improvement in welding strength can be expected. However, when R1/R2 is excessively large, it is necessary to increase the width (W1) of gap 400, and the molten metal (welding portion 300) may not spread sufficiently in gap 400 having a large width (W1). Therefore, R1/R2 has a preferable upper limit.

As described above, in the present embodiment, since welding portion 300 having a wide width (R1) is formed in gap 400, the joint area of welding portion 300 is increased and the joint strength is improved as compared with the structure (a structure in which there is no gap 400 and the width of the welding portion 300 decreases from first member 100 side toward second member 200 side) of the comparative example shown in FIG. 2.

Further, in the present embodiment, since gap 400 is formed by providing protrusion 120 on first member 100 which is the base material, the number of manufacturing steps is reduced and the shape of gap 400 formed between the members is stabilized as compared with the case where the gap is formed by providing the spacer between the members. As a result, the bonding strength is improved more effectively. In other words, it is possible to realize a predetermined bonding strength while suppressing an excessive increase in output of laser welding and reducing damage to the base material and the peripheral members.

Further, since the metal corresponding to raised portion 310 (see FIG. 2) on the laser irradiation side formed when laser welding is performed can flow into gap 400, formation of raised portion 310 (see FIG. 2) of welding portion 300 on the upper surface (surface opposite to first opposing surface 110) of first member 100 is suppressed, and the entire upper surface of first member 100 after welding is formed flat.

According to welding structure 1 of the present embodiment, the above-described operation and effect can be obtained without specifically setting the welding condition.

As an example, the width (W1 [mm]) of gap 400 formed between two protrusions 120 is approximately W1>3.9 [mm], and more preferably approximately W1>7.8 [mm]. A space remains between the molten metal (welding portion 300) spread in gap 400 and the side wall of gap 400.

As an example, the width (W2) of gap 400 along the thickness direction (vertical direction in FIG. 1) of first member 100 and second member 200 is greater than approximately 0.050 mm and less than approximately 0.103 mm, more preferably greater than approximately 0.040 mm and less than approximately 0.100 mm, and still more preferably greater than approximately 0.060 mm and less than approximately 0.080 mm.

As an example, the width (W3 [mm]) of the tips of two protrusions 120 is preferably greater than approximately 2 [mm] from the viewpoint of stabilizing first member 100 mounted on second member 200. The distal end surface of protrusion 120 is preferably formed flat in order to stabilize the shape of gap 400.

Although the shape of gap 400 is not particularly limited, it is preferable that the plate-like shape, that is, the width (W2) in the thickness direction of gap 400 is constant from the viewpoint of making the molten metal easily spread in gap 400.

T2>T1 is satisfied where T2 represents the thickness of the second member 200 in the portion where welding portion 300 is formed and T1 represents the thickness of first member 100 in the portion where welding portion 300 is formed. Here, $0.8 \le D1/T1 \le 1.2$ is satisfied where D1 represents the depth of the welding portion in second member 200 from second opposing surface 210. That is, the welding depth to the inside of second member 200 is approximately equal to or greater than the thickness (T1) of first member 100. In this way, since the welding depth of welding portion 300 to the inside of second member 200 is sufficiently secured, high welding strength can be obtained.

As an example, the thickness T1 of first member 100 and the thickness T2 of second member 200 are both not less than approximately 0.08 mm and not greater than approximately 2.0 mm. As described above, welding structure 1 is characterized in that it is applicable to thin first member 100 and thin second member 200 having different plate thicknesses (T2>T1) and having plate thicknesses (T1, T2) of not greater than approximately 2.0 mm.

As shown in FIG. 1, welding portion 300 may be formed so as to reach the inside of second member 200 from second opposing surface 210 facing gap 400 without penetrating second member 200, or may be formed so as to penetrate second member 200 from second opposing surface 210.

When welding portion 300 is formed so as not to penetrate second member 200, it is possible to reduce the thermal influence on the peripheral members located on the back surface side (lower side in FIG. 1) of second member 200. For example, when first member 100 and second member 200 are formed of an aluminum material having high thermal conductivity, a structure for reducing thermal influence on peripheral members is particularly beneficial.

In the example shown in FIG. 1, two protrusions 120 are formed on first opposing surface 110, and concave portion 130 is formed between two protrusions 120, but the scope of the present disclosure is not limited to the example shown in FIG. 1. For example, protrusion 120 is not essential, and only a concave portion may be formed on first opposing surface 110. Further, gap 400 may be formed by forming a protrusion or a concave portion on second opposing surface 210 without forming a protrusion or a concave portion on first opposing surface 110. Further, protrusions or a concave portion may be provided on both first opposing surface 110 and second opposing surface 210, and gap 400 may be formed therebetween. That is, a protrusion or a concave portion is formed on at least one of first opposing surface 110 and second opposing surface 210, and a gap is formed by the protrusion or the concave portion.

A procedure of a welding method for obtaining above-described welding structure 1 will be described. First, first member 100 having first opposing surface 110 and second member 200 having second opposing surface 210 are overlapped. Here, first member 100 and second member 200 are overlapped in a state where first opposing surface 110 and second opposing surface 210 face each other and gap 400 is formed between first opposing surface 110 and second opposing surface 210. Next, a surface of first member 100 opposite to first opposing surface 110 is irradiated with a laser beam. Thus, first member 100 and second member 200 are laser-welded.

Here, welding portion 300 is formed by the laser welding so as to penetrate first member 100 and extend toward the inside of second member 200 from second opposing surface 210 facing gap 400. As described above, the relationship among the width (R1) of welding portion 300 in gap 400, the width (R2) of welding portion 300 on first opposing surface 110 of first member 100, the thickness (T1) of first member 100 and the thickness (T2) of second member 200 in the portion where welding portion 300 is formed, and the depth (D1) of welding portion 300 from second opposing surface 210 in second member 200 is:

$R1 > R2;$ $T2 > T1;$ and $0.8 \leq D1/T1 \leq 1.2.$

Prior to the laser welding step, at least one of first opposing surface 110 and second opposing surface 210 is preferably subjected to a surface treatment for enhancing wettability with the molten metal during the laser welding. Specifically, at least one of first opposing surface 110 and second opposing surface 210 is subjected to an acid treatment to remove the oxide film, thereby enhancing wettability with the molten metal. By increasing the wettability of the surface, the molten metal tends to spread in gap 400, and the width (R1) of welding portion 300 in gap 400 can be widened to further improve the bonding strength.

Figure 4:
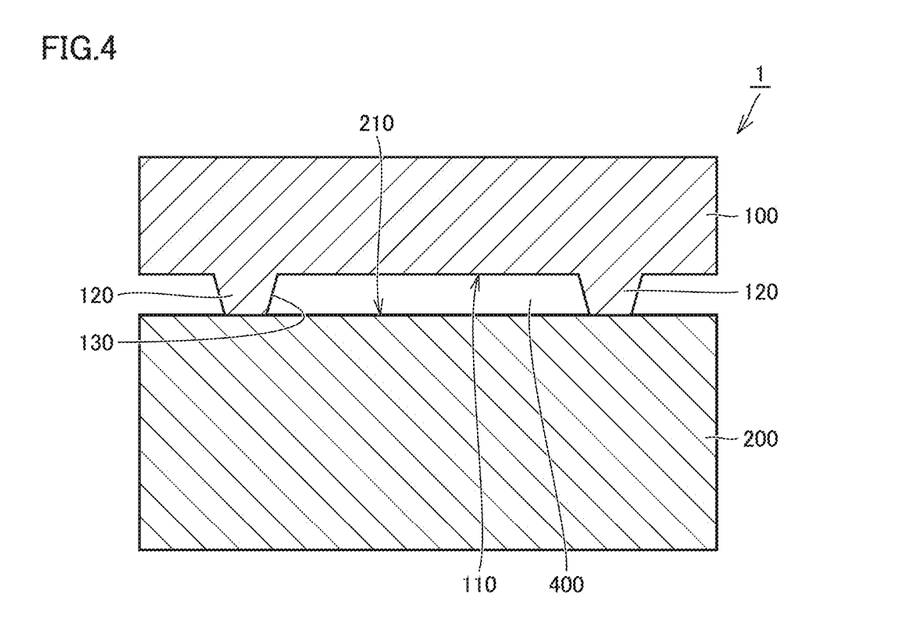
FIGS. 4 to 7 are cross-sectional views showing modified examples of the metal members to which the welding structure of the metal members according to an embodiment is applied.
Figure 5:
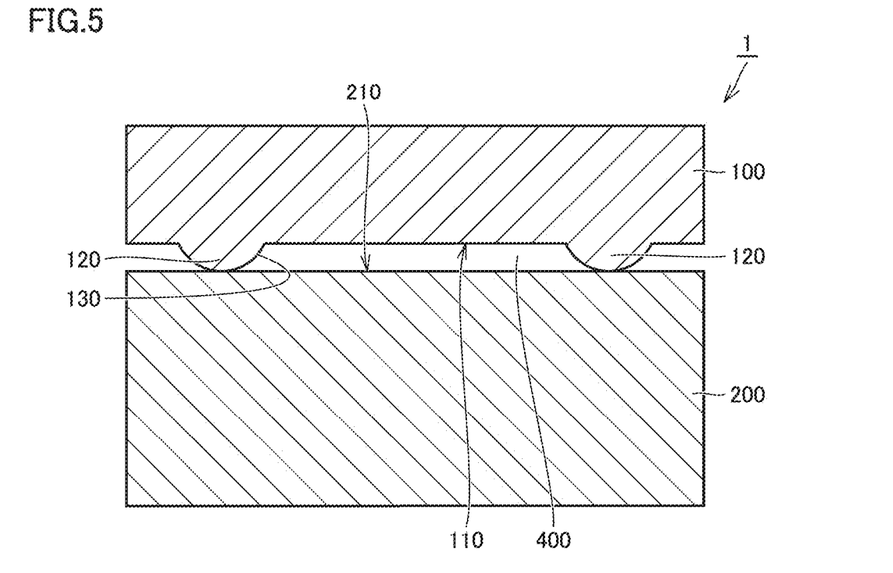
Figure 6:
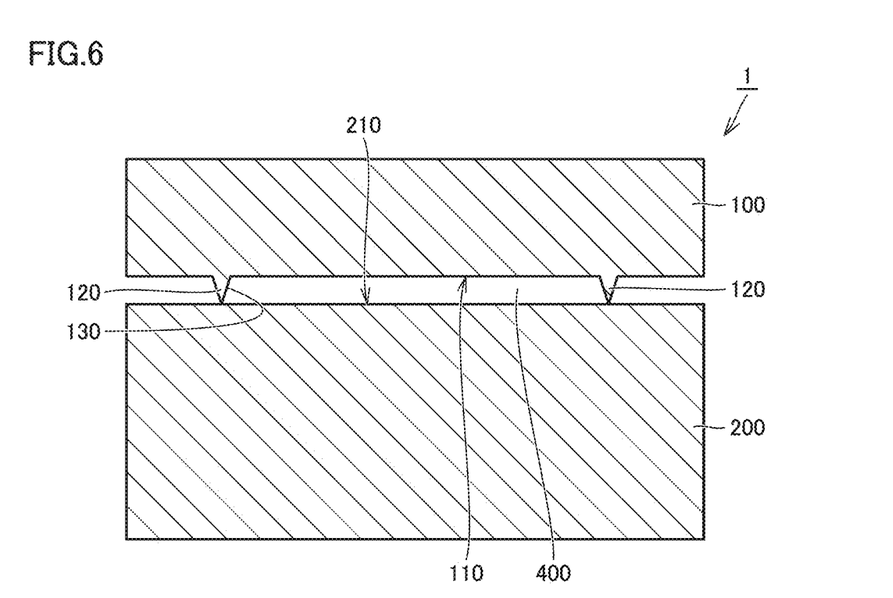
Figure 7:
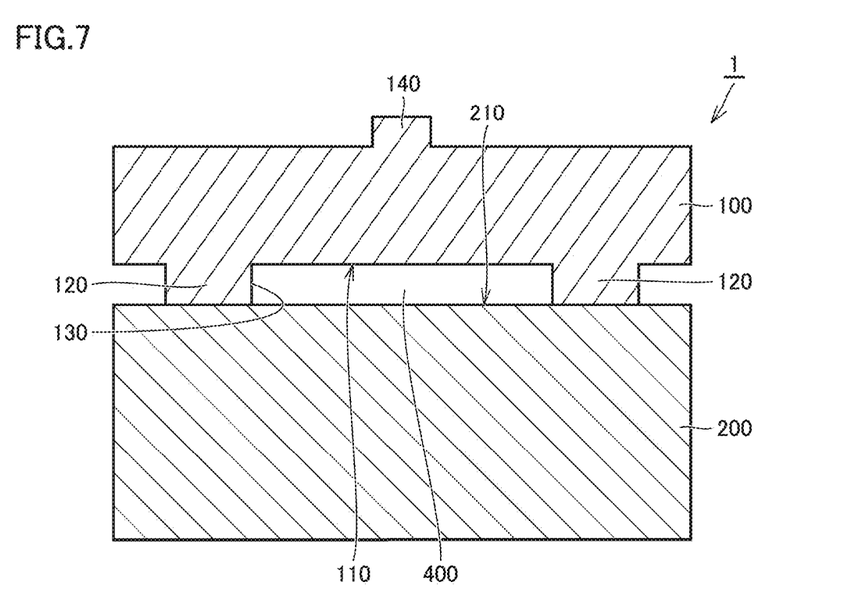

FIGS. 4 to 7 are cross-sectional views showing modifications of the metal members. As shown in FIG. 4, the cross section of protrusion 120 may have an inverted trapezoid shape. As shown in FIG. 5, the cross section of protrusion 120 may have a shape including curved surface. As shown in FIG. 6, the cross section of protrusion 120 may have a pointed tip. As shown in FIG. 7, another protrusion 140 may be provided on the surface of first member 100 opposite to first opposing surface 110 so that the laser welding can be aligned using other protrusion 140 as a target.

Figure 8:
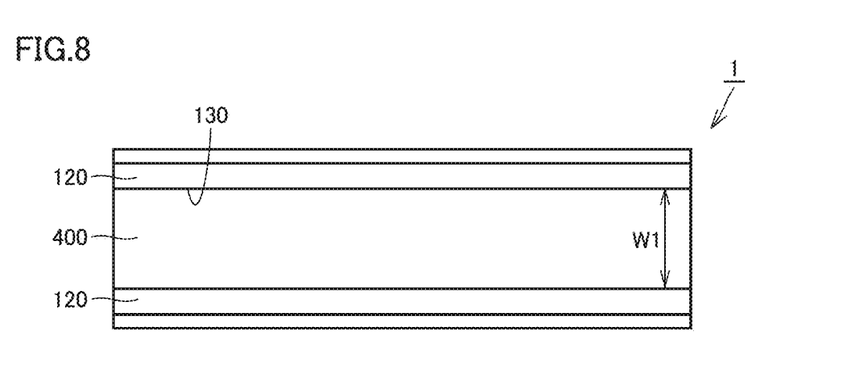
FIG. 8 is a top view showing a welding structure of metal members according to an embodiment.

FIG. 8 is a top view showing welding structure 1. As shown in FIG. 8, when viewed from above, gap 400 is formed so as to extend a distance longer than the width (W1 [mm]) of concave portion 130 in the depth direction of the cross section.

The present inventors have confirmed in the following manner that the welding strength of first member 100 and second member 200 is improved by welding structure 1 of the metal members according to the present embodiment.

First, first member 100 (thickness T1: 0.8 mm) and a second member 200 (thickness T2: 2.0 mm) made of an aluminum material (A1050-H24) were prepared. Next, first member 100 and second member 200 were laser-welded under the conditions of a laser output of 1500 W, a scanning speed of 240 mm/s, and a laser diameter of 50 μm.

Two samples of "Example" (corresponding to FIG. 1) in which gap 400 was formed between first member 100 and second member 200, and two samples of "Comparative Example" (corresponding to FIG. 2) in which gap 400 was not formed, were prepared. The measured values of each sample are shown in Table 1 below.

TABLE 1

| Sample | | T1 | D1 | W2 | R1 | R2 | R1/R2 |
|---|---|---|---|---|---|---|---|
| | | \[mm\] | | | | | |
| Example | A1 | 0.650 | 0.641 | 0.073 | 0.501 | 0.378 | 1.325 |
| | A2 | 0.706 | 0.691 | 0.073 | 0.518 | 0.371 | 1.396 |
| Comparative | B1 | 0.597 | 0.767 | — | 0.371 | 0.371 | 1.000 |
| Example | B2 | 0.615 | 0.740 | — | 0.368 | 0.368 | 1.000 |

As to each of samples A1 and A2 of "Example" and samples B1 and B2 of "Comparative Example" shown in Table 1, first member 100 and second member 200 were pulled away from each other by using an autograph, and the load at the fracture point of the welding portion was measured (tensile speed: 1 mm/min, data sampling interval: 10 μm). As a result, in the samples A1 and A2 of "Example", the load at the fracture point was increased by approximately 42% as compared with the samples B1 and B2 of "Comparative Example" (average value: 233N (Example)/163N (Comparative Example)).

Figure 9:
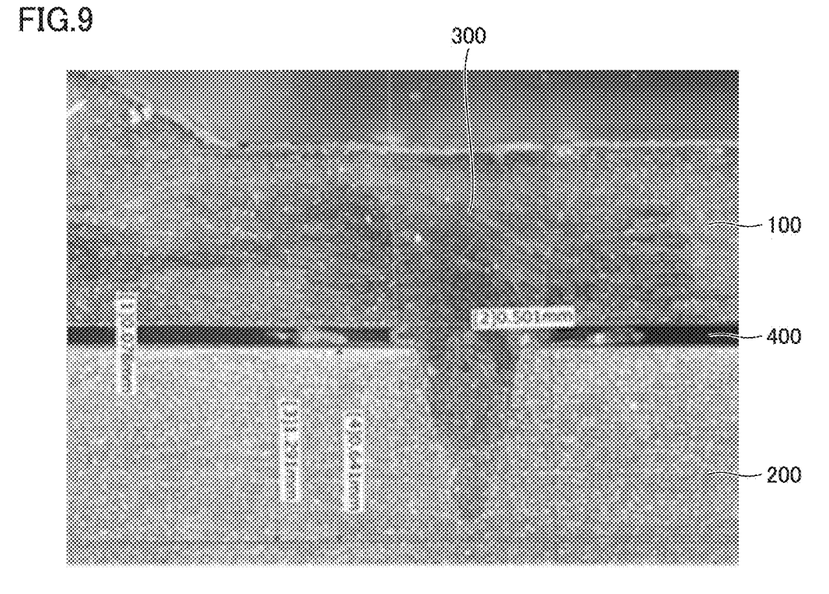
FIGS. 9 and 10 are photographs showing a cross section of a welding structure of metal members according to an embodiment.
Figure 10:
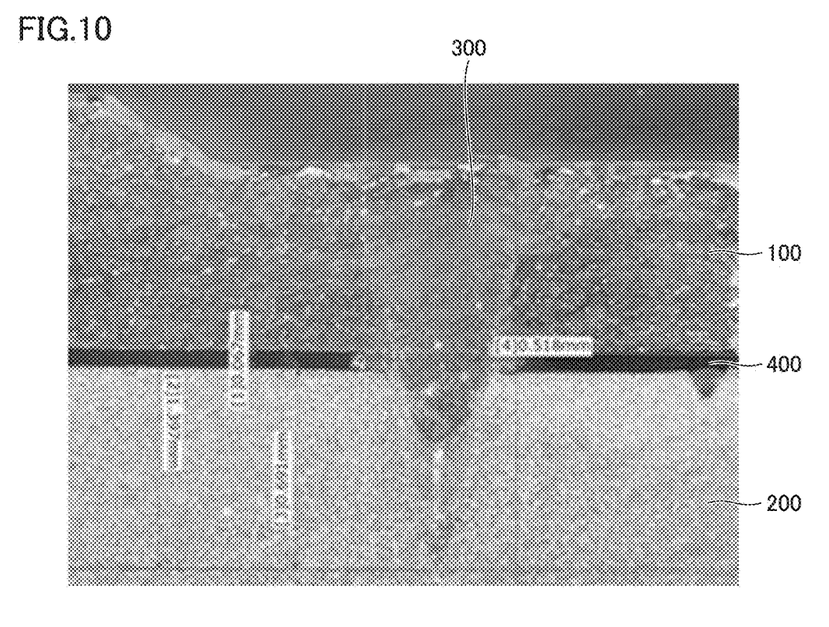
Figure 11:
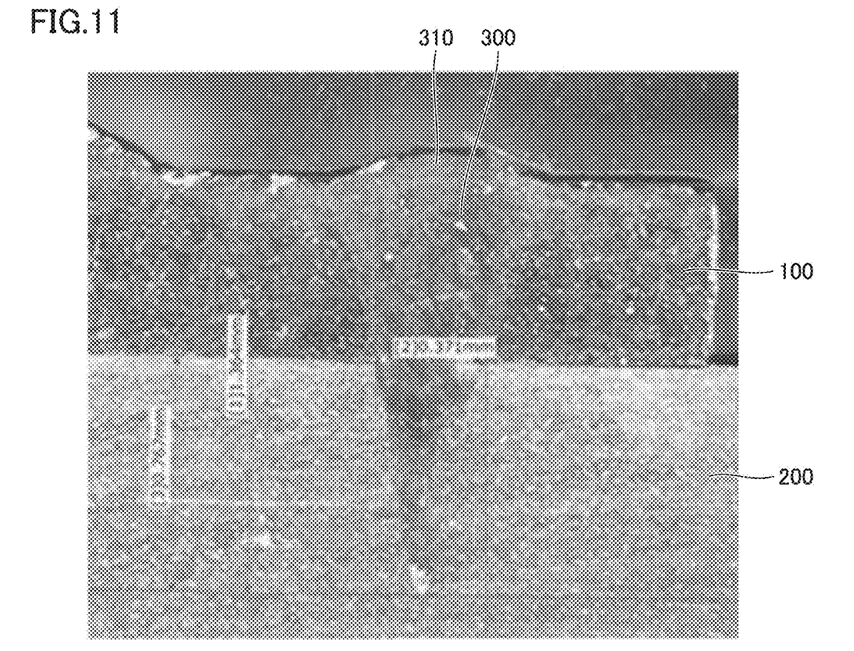
FIGS. 11 and 12 are photographs showing a cross section of a welding structure of metal members according to a comparative example.
Figure 12:
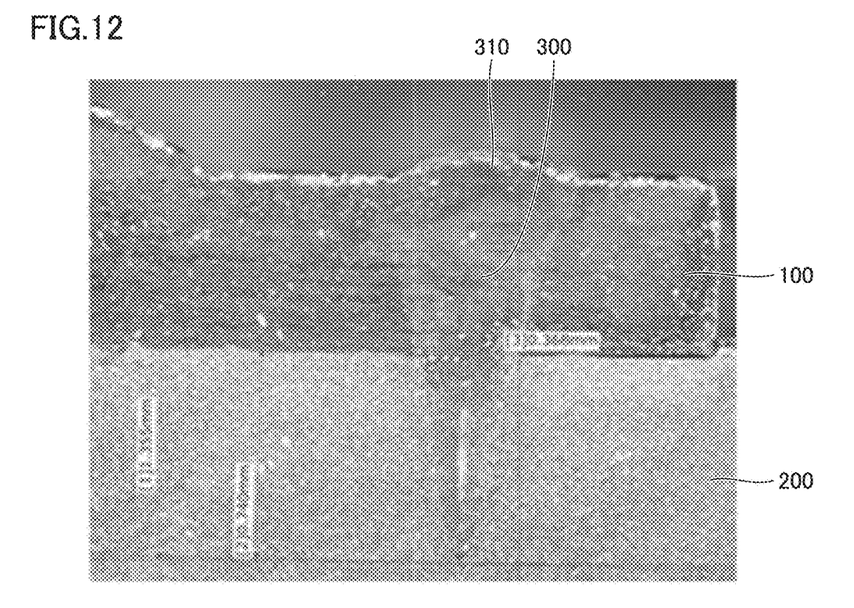

FIGS. 9 and 10 are photographs showing a cross section (with gap 400) of welding structure 1 of metal members according to the present embodiment, and FIGS. 11 and 12 are photographs showing a cross section (without gap 400) of welding structure 1 of metal members according to the comparative example.

As shown in FIGS. 9 and 10, in welding structure 1 of metal members according to the present embodiment, the molten metal flows into gap 400, welding portion 300 is widened in gap 400, and the upper surface of first member 100 is formed flat over the entire surface.

As shown in FIGS. 11 and 12, in welding structure 1 of the metal members according to the comparative example, since there is no portion corresponding to gap 400, the width of welding portion 300 becomes narrower from first member 100 toward the inside of second member 200. A raised portion 310 is formed on the upper surface of first member 100. In the cross sections shown in FIGS. 11 and 12, the cross-sectional area of the raised portion is 0.039 mm$^2$. The cross sections shown in FIGS. 9 and 10 are formed under the same welding conditions as those in FIGS. 11 and 12, and the amount of molten metal caused by welding is assumed to be the same. In the cross section shown in FIGS. 9 and 10, raised portion 310 is not formed, and the upper surface of first member 100 is formed flat. Therefore, in the cross sections shown in FIGS. 9 and 10, the width (R1) of welding portion 300 in gap 400 can be calculated by the formula R1=0.039/W2. On the other hand, the width (R2) of welding portion 300 on first opposing surface 110 of first member 100 is substantially constant at R2=0.38 mm regardless of the presence or absence of gap 400, so that R2=0.38 mm (a constant value). Under these premises, the value of "R1/R2" is calculated while W2 is varied as shown in Table 2.

TABLE 2

| | [mm] | | |
|---|---|---|---|
| No. | R1/R2 | R1 | W2 |
| 1 | 10.263 | 3.900 | 0.010 |
| 2 | 5.132 | 1.950 | 0.020 |
| 3 | 3.421 | 1.300 | 0.030 |
| 4 | 2.566 | 0.975 | 0.040 |
| 5 | 2.053 | 0.780 | 0.050 |
| 6 | 1.711 | 0.650 | 0.060 |
| 7 | 1.466 | 0.557 | 0.070 |
| 8 | 1.283 | 0.488 | 0.080 |
| 9 | 1.140 | 0.433 | 0.090 |
| 10 | 1.026 | 0.390 | 0.100 |
| 11 | 1.000 | 0.380 | 0.103 |
| 12 | 0.933 | 0.355 | 0.110 |

Among the samples shown in Table 2, Sample Nos. 11 and 12 are different from welding structure 1 according to the present embodiment because R1>R2 is not satisfied. On the other hand, for Sample Nos. 1 to 10, R1>R2 is satisfied, which can be included in welding structure 1 according to the present embodiment. However, in the samples Nos. 1 to 3, R1/R2 is greater than 3, and the molten metal may hardly spread in gap 400 until it falls within this range. In this sense, in Table 2, Sample Nos. 4 to 10 are more preferable examples, and Sample Nos. 6 to 8 are most preferable examples.

Figure 13:
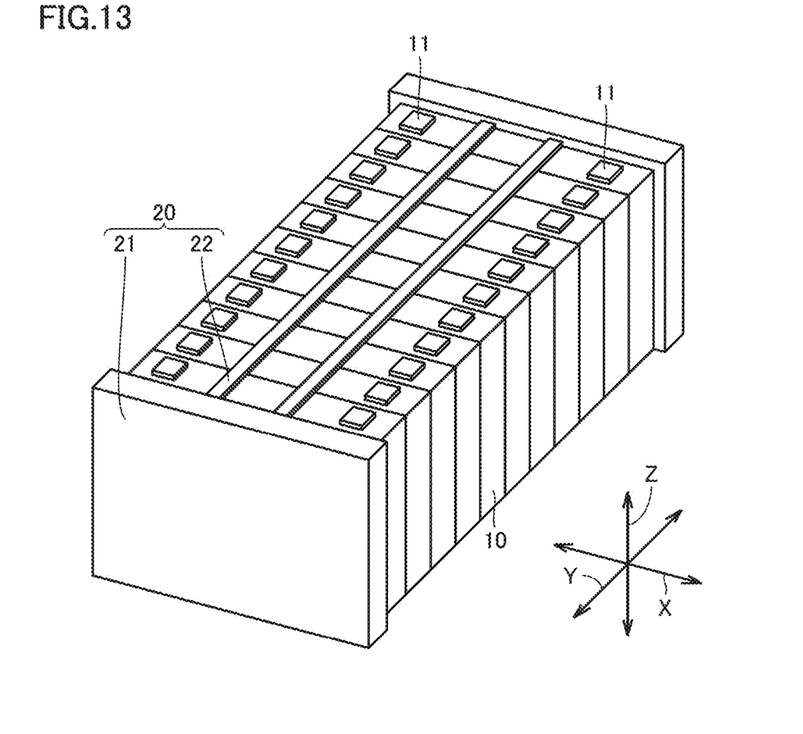
FIG. 13 is a diagram showing a basic configuration of an assembled battery.
Figure 14:
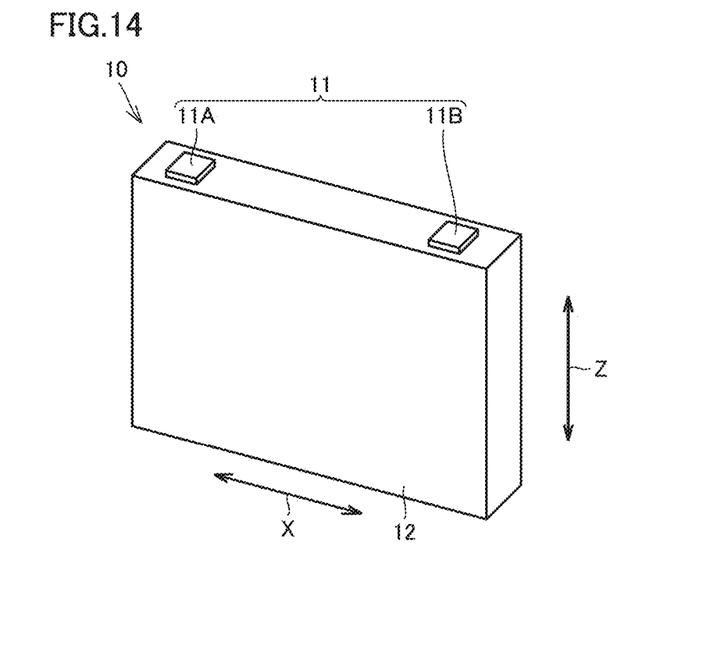
FIG. 14 is a view showing a battery cell in the assembled battery.

FIG. 13 is a diagram showing a basic configuration of an assembled battery. FIG. 14 is a diagram showing a battery cell 10 in the assembled battery.

As shown in FIGS. 13 and 14, the assembled battery includes battery cell 10 and a restraining member 20. Plurality of battery cells 10 are arranged in the Y-axis direction (arrangement direction). Battery cell 10 includes an electrode terminal 11. A separator (not shown) is interposed between plurality of battery cells 10.

As an example, battery cell 10 is a lithium ion battery, but battery cell 10 may be another battery such as a nickel-hydrogen battery. Further, in the present disclosure, the "power storage module" is not limited to the assembled battery, and for example, a capacitor may be used as the "power storage cell" instead of battery cell 10.

Restraining member 20 includes an end plate 21 and a fastening member 22. End plates 21 are arranged at both ends of the assembled battery in the Y-axis direction. The fastening member 22 connects two end plates 21 located at both ends in the Y-axis direction to each other and restrains two end plates 21.

As shown in FIG. 14, battery cell 10 is formed in a flat rectangular parallelepiped shape. Electrode terminal 11 includes a positive electrode terminal 11A and a negative electrode terminal 11B. Electrode terminal 11 is formed on a housing case 12. An electrode body (not shown) and an electrolytic solution are accommodated in housing case 12.

Figure 15:
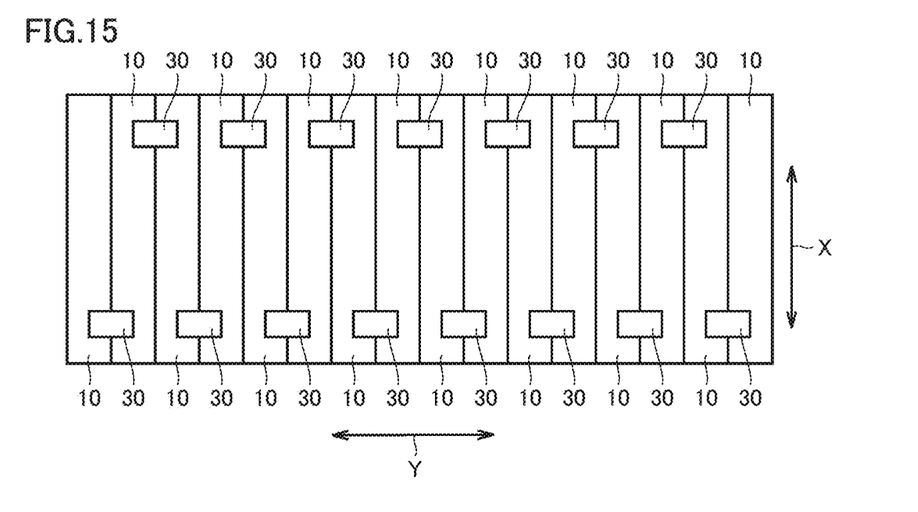
FIG. 15 is a view showing an arrangement of bus bars in the assembled battery.

FIG. 15 is a diagram showing an arrangement of bus bars 30 in the assembled battery. In the example of FIG. 15, positive electrode terminal 11A and negative electrode terminal 11B of adjacent battery cells 10 are electrically connected by bus bars 30, and plurality of battery cells 10 are electrically connected in series.

That is, the assembled battery includes plurality of battery cells 10 each having electrode terminal 11 and arranged along a predetermined direction, and bus bar 30 connecting electrode terminals 11 of plurality of battery cells 10. The above-described welding structure 1 is applied to the joint between bus bar 30 (first member) and electrode terminal 11 (second member).

Note that the location where welding structure 1 is applied is not limited to the joint portion between bus bar 30 and electrode terminal 11, but may be applied to another portion such as a current collector part in the assembled battery or battery cell 10.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A welding structure of metal members comprising:
   a first member having a first opposing surface;
   a second member having a second opposing surface opposed to the first opposing surface; and
   a welding portion fixing the first member and the second member to each other, wherein
   a gap is formed between the first opposing surface and the second opposing surface,
   the welding portion is formed so as to penetrate the first member and extend from the second opposing surface facing the gap toward the inside of the second member,
   R1>R2 is satisfied where R1 represents a width of the welding portion in the gap and R2 represents a width of the welding portion on the first opposing surface of the first member,
   T2>T1 is satisfied where T2 represents a thickness of the second member in the portion where the welding portion is formed and T1 represents a thickness of the first member in the portion where the welding portion is formed,
   $0.8 \leq D1/T1 \leq 1.2$ is satisfied where D1 represents a depth of the welding portion in the second member from the second opposing surface,
   a protrusion is formed on at least one of the first opposing surface and the second opposing surface, and the gap is formed by the protrusion, and
   a surface of the first member opposite to the first opposing surface is formed flat between a position opposed to the protrusion and a position adjacent to the protrusion.

2. The welding structure of metal members according to claim 1, wherein the first member and the second member are both made of an aluminum material.

3. The welding structure of metal members according to claim 1, wherein a width of the gap along a thickness direction of the first member and the second member is not less than 0.05 mm and not greater than 0.1 mm.

4. The welding structure of metal members according to claim 1, wherein both of the thickness T1 of the first member and the thickness T2 of the second member are not less than 0.08 mm and not greater than 2.0 mm.

5. The welding structure of metal members according to claim 1, wherein the welding portion is formed so as to reach the inside of the second member from the second opposing surface facing the gap without completely penetrating the second member over an entire thickness of the second member.

6. A power storage module comprising:
a plurality of power storage cells each having an electrode terminal and being arranged along a predetermined direction;
a bus bar connecting the electrode terminals of the plurality of power storage cells to each other; and
the welding structure of metal members according to claim 1, including the bus bar as the first member and the electrode terminal as the second member.

7. The welding structure of metal members according to claim 1, wherein another protrusion is provided on surface of the first member opposite to the first opposing surface at a position apart from the protrusion in an extending direction of the gap.

8. A welding structure of metal members comprising:
a first member having a first opposing surface;
a second member having a second opposing surface opposed to the first opposing surface; and
a welding portion fixing the first member and the second member to each other, wherein
a gap is formed between the first opposing surface and the second opposing surface,
the welding portion is formed so as to penetrate the first member and extend from the second opposing surface facing the gap toward the inside of the second member,
$R1>R2$ is satisfied where R1 represents a width of the welding portion in the gap and R2 represents a width of the welding portion on the first opposing surface of the first member,
$T2>T1$ is satisfied where T2 represents a thickness of the second member in the portion where the welding portion is formed and T1 represents a thickness of the first member in the portion where the welding portion is formed,
$0.8 \leq D1/T1 \leq 1.2$ is satisfied where D1 represents a depth of the welding portion in the second member from the second opposing surface, wherein
the welding portion is formed so as to completely penetrate the second member over an entire thickness of the second member from the second opposing surface facing the gap.

9. A method of welding metal members comprising:
overlapping a first member having a first opposing surface and a second member having a second opposing surface in a state where the first opposing surface and the second opposing surface oppose each other and a gap is formed between the first opposing surface and the second opposing surface;
laser welding the first member and the second member by irradiating with a laser beam a surface of the first member opposite to the first opposing surface; and
prior to the laser welding, subjecting at least one of the first opposing surface and the second opposing surface to an acid treatment to remove an oxide film for enhancing wettability with a molten metal during the laser welding, wherein
a welding portion is formed by the laser welding so as to penetrate the first member and extend from the second opposing surface facing the gap toward the inside of the second member,
$R1>R2$ is satisfied where R1 represents a width of the welding portion in the gap and R2 represents a width of the welding portion on the first opposing surface of the first member,
$T2>T1$ is satisfied where T2 represents a thickness of the second member in the portion where the welding portion is formed and T1 represents a thickness of the first member in the portion where the welding portion is formed, and
$0.8 \leq D1/T1 \leq 1.2$ is satisfied where D1 represents a depth of the welding portion in the second member from the second opposing surface.

* * * * *